(12) United States Patent
Hutchinson et al.

(10) Patent No.: US 8,317,265 B2
(45) Date of Patent: Nov. 27, 2012

(54) REVERSIBLE CHILD CAR SEAT WITH SEPARABLE BASE MEMBER

(75) Inventors: James M. F. Hutchinson, Mohnton, PA (US); Robert E. Haut, West Chester, PA (US); Ryan N. Miller, Lancaster, PA (US)

(73) Assignee: Wonderland Nurserygoods Co., Ltd, Taipei (TW)

( * ) Notice: Subject to any disclaimer, the term of this patent is extended or adjusted under 35 U.S.C. 154(b) by 0 days.

(21) Appl. No.: 12/794,750

(22) Filed: Jun. 6, 2010

(65) Prior Publication Data
US 2010/0237672 A1 Sep. 23, 2010

Related U.S. Application Data

(62) Division of application No. 11/953,062, filed on Dec. 9, 2007, now Pat. No. 7,735,921.

(60) Provisional application No. 60/874,392, filed on Dec. 12, 2006.

(51) Int. Cl.
*B60N 2/26* (2006.01)

(52) U.S. Cl. .......... 297/256.14; 297/256.16; 297/256.13

(58) Field of Classification Search ............ 297/256.16, 297/250.1, 256.14, 256.13, 252, 256.1
See application file for complete search history.

(56) References Cited

U.S. PATENT DOCUMENTS

| | | | | |
|---|---|---|---|---|
| 3,934,934 A | * | 1/1976 | Farrell et al. | 297/467 |
| 3,992,056 A | * | 11/1976 | Koziatek et al. | 297/256.13 |
| 4,113,306 A | * | 9/1978 | von Wimmersperg | 297/216.11 |
| 4,345,791 A | * | 8/1982 | Bryans et al. | 297/256.14 |
| 4,615,562 A | * | 10/1986 | Bell et al. | 297/256.14 |
| 4,804,230 A | * | 2/1989 | Friedman | 297/440.12 |
| 4,915,446 A | * | 4/1990 | Darling et al. | 297/256.14 |
| 4,971,392 A | * | 11/1990 | Young | 297/256.12 |
| 5,052,750 A | | 10/1991 | Takahashi | |
| 5,385,385 A | * | 1/1995 | Silverman | 297/250.1 |
| 5,890,762 A | * | 4/1999 | Yoshida | 297/256.13 |
| 5,947,556 A | * | 9/1999 | Strojny | 297/256.16 |
| 6,017,088 A | * | 1/2000 | Stephens et al. | 297/256.16 |
| 6,428,099 B1 | * | 8/2002 | Kain | 297/256.1 |
| 6,505,887 B2 | * | 1/2003 | Hampton | 297/256.1 |
| 6,568,755 B1 | * | 5/2003 | Groening | 297/256.13 |
| 6,746,080 B2 | | 6/2004 | Tsugimatsu | |
| 7,073,859 B1 | * | 7/2006 | Wilson | 297/256.1 |
| 7,086,695 B2 | | 8/2006 | Hosoya | |

(Continued)

FOREIGN PATENT DOCUMENTS

| EP | 155784 A2 | * | 9/1985 |
| EP | 164909 A2 | * | 12/1985 |
| EP | 228158 A2 | * | 7/1987 |

*Primary Examiner* — Milton Nelson, Jr.
(74) *Attorney, Agent, or Firm* — Miller Law Group, PLLC

(57) ABSTRACT

A car seat includes a seat member on which the child is transported and a separable base member that is mounted to the vehicle seat via the vehicle seat belt which is passed through side openings in the base member and trapped in a belt latch apparatus to secure the base member to the vehicle seat. The seat member is mounted on the base member in either a forward-facing orientation or a rear-facing orientation. The base member includes a pair of upper and lower recline slots that receive latch pins securing the seat member to the base member. A recline apparatus carried by the seat member engages a central control rack on the base member to lock the seat member in a selected recline position. In the rear-facing position, the seat member is positionable in different orientations to compensate for the angle at which the vehicle seat is formed.

19 Claims, 17 Drawing Sheets

U.S. PATENT DOCUMENTS 7,090,294 B2     8/2006  Balensiefer
7,163,265 B2 *   1/2007  Adachi .................... 297/256.12
2005/0264064 A1 * 12/2005  Hei et al. ................... 297/250.1
2006/0273640 A1  12/2006  Kassai

* cited by examiner

Fig. 2
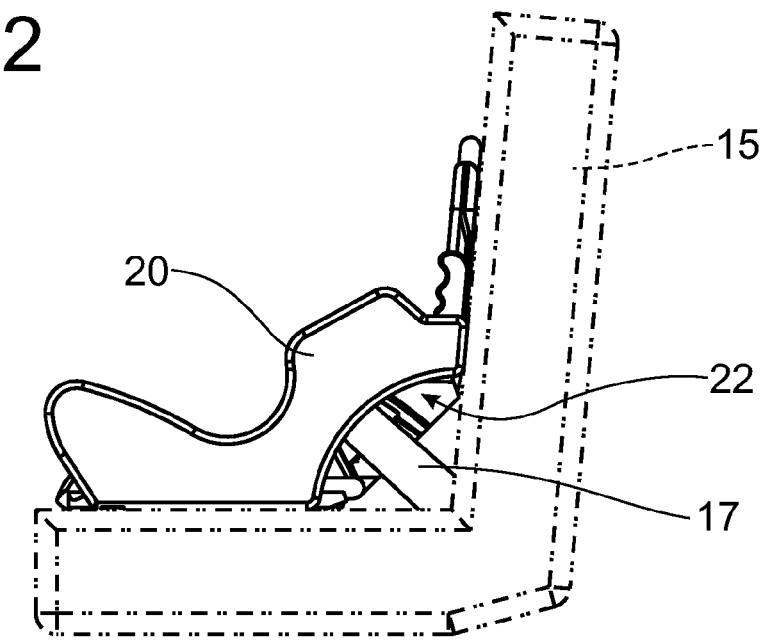
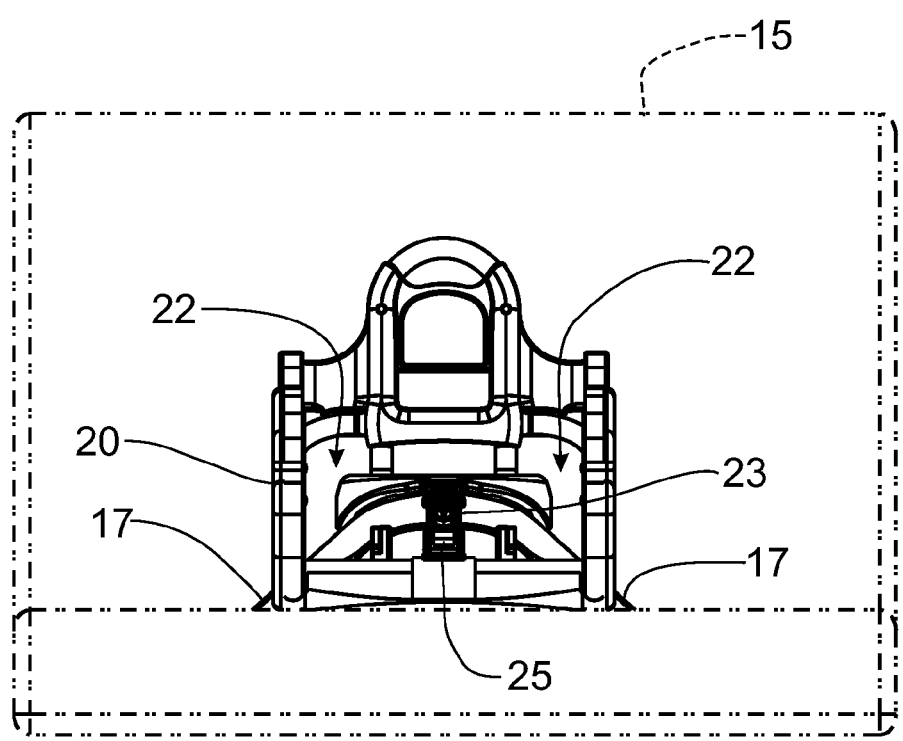
Fig. 3

Fig. 5
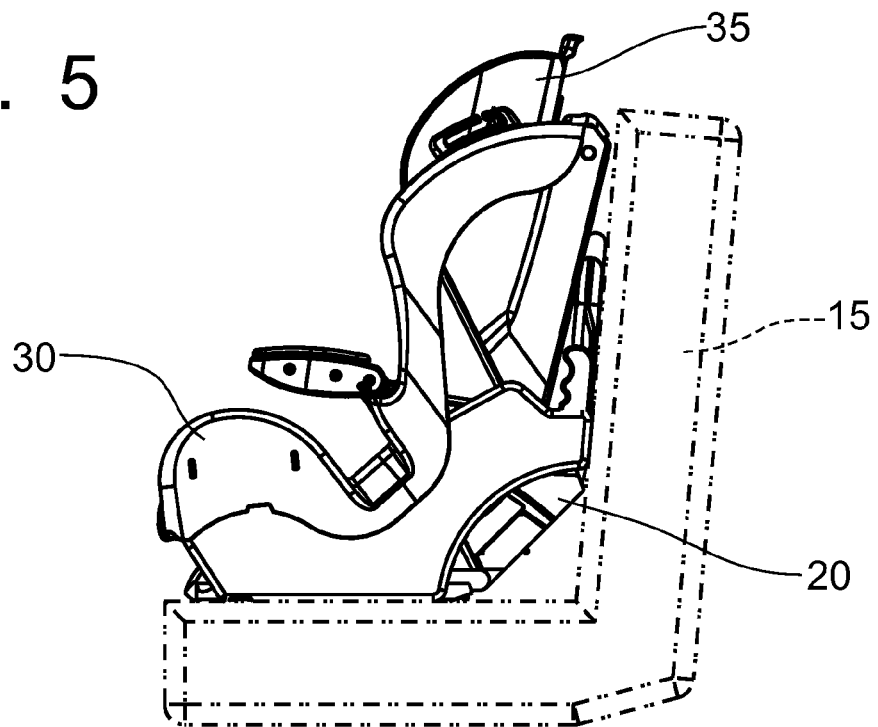
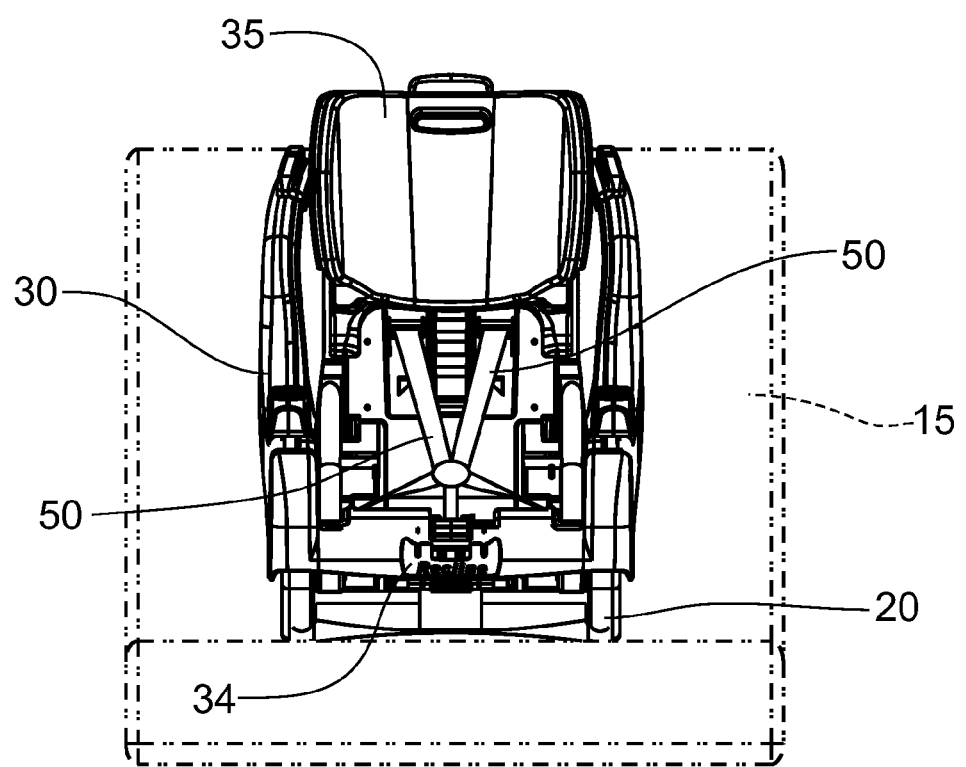
Fig. 6

Fig. 10
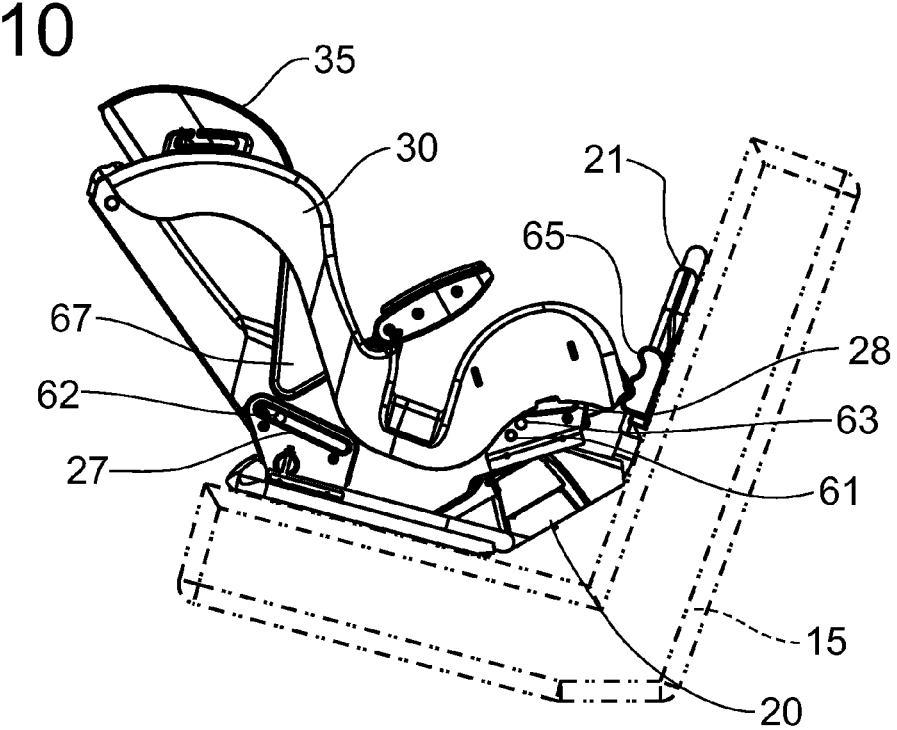
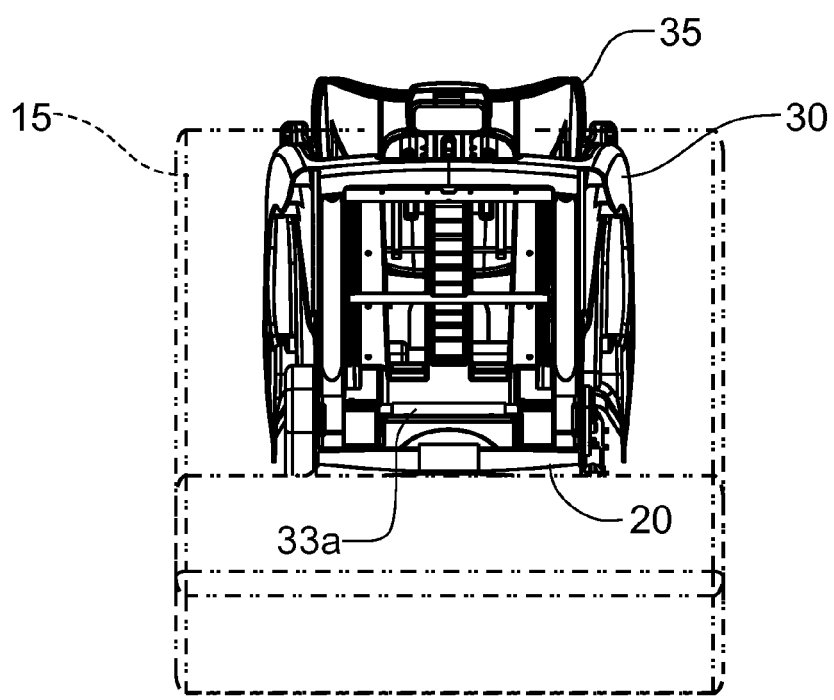
Fig. 11

REVERSIBLE CHILD CAR SEAT WITH SEPARABLE BASE MEMBER

CROSS-REFERENCE TO RELATED APPLICATIONS

This application is a division of U. S. patent application Ser. No. 11/953,062, filed on Dec. 9, 2007, issued as U. S. Pat. No. 7,735,921 on Jun. 15, 2010, and claims domestic priority on U. S. Provisional Patent Application Ser. No. 60/874,392, filed on Dec. 12, 2006, the contents of which are incorporated herein by reference.

FIELD OF THE INVENTION

The present invention relates generally to a car seat for use in transporting children in an automobile, and, more particularly, to a car seat positionable on an independent base member in either a front-facing or a rear-facing orientation.

BACKGROUND OF THE INVENTION

Car safety seats for children are commercially available in a many configurations corresponding to differences in the age, weight, and size of the child being transported. Parents can choose a car seat that is not only the correct size, but also suits their tastes, budget, and life style. As children grow in size and maturity level, they need different kinds of car seats. For example, a child may initially use a rearwardly facing infant car seat, then graduate to a forward facing toddler seat with an integrated harness, and finally to a belt positioning booster seat utilizing the vehicle's lap and shoulder belt system before being able to safely use the vehicle's seat belts alone.

There are many car seats on the market that can be used in multiple configurations. For instance, a forward facing car seat with an integral harness appropriate for a 20-40 pound child might accommodate a child weighing 30-100 pounds as a belt positioning booster seat with the removal of the harness and utilizing the vehicle's lap and shoulder belts. This is convenient for the care giver because it means fewer seats to purchase. Some parents choose to buy a belt positioning booster seat for their older child. Such a booster seat may be configured with a high back, such as is disclosed in U.S. Pat. No. 6,682,143, granted to Davis Amirault on Jan. 27, 2004, or can have no back at all. Older children who don't want to be seen sitting in a "baby seat" like this option and parents don't have to manage a big bulky car seat.

Currently available car seats typically have a monolithic shell, i.e. the back and seat cannot be used separately. Some car seats are designed to have a no back base option, but are configured as a separate seat fastened under the monolithic seat and back, such as is disclosed in U.S. Pat. No. 4,754,999, issued on Jul. 5, 1998, to James Kain. The problem with this configuration is the redundancy of seats; one as part of the monolithic shell, and one as a seat only.

The basic purpose of a child's car seat is to protect the child in case the vehicle in which the car seat is mounted is involved in a crash event. Protecting the child involves limiting excursion and controlling the forces exerted on the child from the vehicle undergoing a crash event. Improper installation of a car seat is a major factor in a loss of protection for the child. If the car seat requires a complicated or complex belt path along which the vehicle seat belt is positioned to secure the car seat to the vehicle seat, the likelihood that the car seat will be properly installed is diminished. A belt path for the vehicle seat belt that is more visible and easier to access will increase the likelihood that the car seat will have a tight, proper installation.

During the first year of the life of a baby, the child should be positioned in a car seat in a manner to be facing rearwardly. When the child is over a year old, the child can be placed in the car seat in a manner that the child is facing forwardly. Presently known car seats require a remounting of the car seat and a repositioning of the vehicle seat belt to accomplish this conversion in orientation or the substitution of a different and larger car seat. Each time the car seat is reconfigured or moved from one vehicle to another, a new opportunity to improperly mount the car seat on the vehicle seat is presented, which can be aggravated by a non-intuitive, complicated belt path for mounting the car seat.

Many child car seats provide options for reclining the seat relative to the vehicle seat on which the car seat is mounted. Most known child car seats require a readjustment of the vehicle seat belt when changes are made to the recline orientation of the car seat. Readjusting the vehicle seat belt is an inconvenience to the person making the recline adjustment and provides an additional opportunity for the car seat to become improperly installed, which would not provide the optimum safety for the child positioned within the car seat.

It would also be desirable to provide a child car seat that has a base part that is separable from the seat part so that the base member could be installed in a position that would not need changing, even though the seat member could be repositioned on the base member, or the recline position of the seat member would be adjusted. It would be further desirable that the seat portion be configurable in either the forward-facing orientation or the rear-facing orientation as selected.

SUMMARY OF THE INVENTION

It is an object of this invention to provide a car seat for transporting children in an automobile that can be reversed from a rear-facing orientation to a forward-facing orientation without dismounting the car seat from the vehicle seat.

It is another object of this invention to provide a base member that is separable from the seat member so that the base member can remain secured to the vehicle seat irrespective of the orientation of the seat member on the base member.

It is a feature of this invention that the base member is independent from the seat member to permit the base member to remain secured to the vehicle seat while the seat member is reconfigured.

It is an advantage of this invention that the seat member can be placed on the independent base member in either a rear-facing orientation or a forward-facing orientation.

It is another advantage of this invention that the seat member can be placed into a selected recline position without requiring the car seat to be remounted to the vehicle seat.

It is another feature of this invention that the base member is formed with upper and lower recline slots to guide the positioning of the seat member through the various selectable recline positions.

It is still another feature of this invention that the base member is formed with a central recline rack that is engagable with a recline bar on the seat member to lock the seat member in a selected recline position.

It is still another advantage of this invention that the rear-facing seat member can be positioned in one of a plurality of selectable positions to orient the seat member in a desired reclined orientation to accommodate differently configured vehicle seats.

It is yet another feature of this invention that the seat member is secured to the base member by retractable latch pins that are engaged with the upper and lower recline slots.

It is yet another advantage of this invention that the car seat can be used to transport a child from an infant size to a maximum size required to be transported within a car seat without requiring the base member to be disconnected from the vehicle seat.

It is still another advantage of this invention that the vehicle seat belt is easily secured to the base member through a highly visible and intuitive path that will encourage proper mounting of the car seat.

It is still another feature of this invention that the vehicle seat belt is passed through one side opening in the base member across a latch member and through an opposing side opening in the base member to secure the base member to the vehicle seat.

It is yet another feature of this invention that the seat member can be utilized with multiple base members installed in respective vehicles.

It is yet another advantage of this invention that the concept of having multiple car seats for use in different vehicles can be accomplished by purchasing multiple base members, but only one seat member.

It is yet another object of this invention to provide a reversible car seat having a base member separable from a seat member, which is durable in construction, inexpensive of manufacture, carefree of maintenance, facile in assemblage, and simple and effective in use.

These and other objects, features and advantages are accomplished according to the instant invention by providing a car seat having a seat member on which the child is transported and a separable base member that is mounted to the vehicle seat via the vehicle seat belt or latch anchor which is passed through side openings in the base member and trapped in a belt latch apparatus to secure the base member to the vehicle seat. The seat member is mounted on the base member in either a forward-facing orientation or a rear-facing orientation. The base member includes a pair of upper and lower recline slots that receive latch pins securing the seat member to the base member. A recline apparatus carried by the seat member engages a central control rack on the base member to lock the seat member in a selected recline position. In the rear-facing position, the seat member is positionable in different orientations to compensate for the angle at which the vehicle seat is formed.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a left side elevational view of the base member shown in FIG. 1, the representative vehicle seat being shown in phantom;

FIG. 3 is a front elevational view of the base member shown in FIG. 1;

FIG. 5 is a left side elevational view of the seat mounted on the base member, as shown in FIG. 4, the representative vehicle seat being shown in phantom;

FIG. 6 is a front elevational view of the seat mounted on the base member, as depicted in FIGS. 4 and 5;

FIG. 10 is a left side elevational view of the seat mounted on the base member, as shown in FIG. 9, the representative vehicle seat being shown in phantom;

FIG. 11 is a front elevational view of the seat mounted on the base member, as depicted in FIGS. 9 and 10;

DETAILED DESCRIPTION OF THE PREFERRED EMBODIMENT

Figure 1:
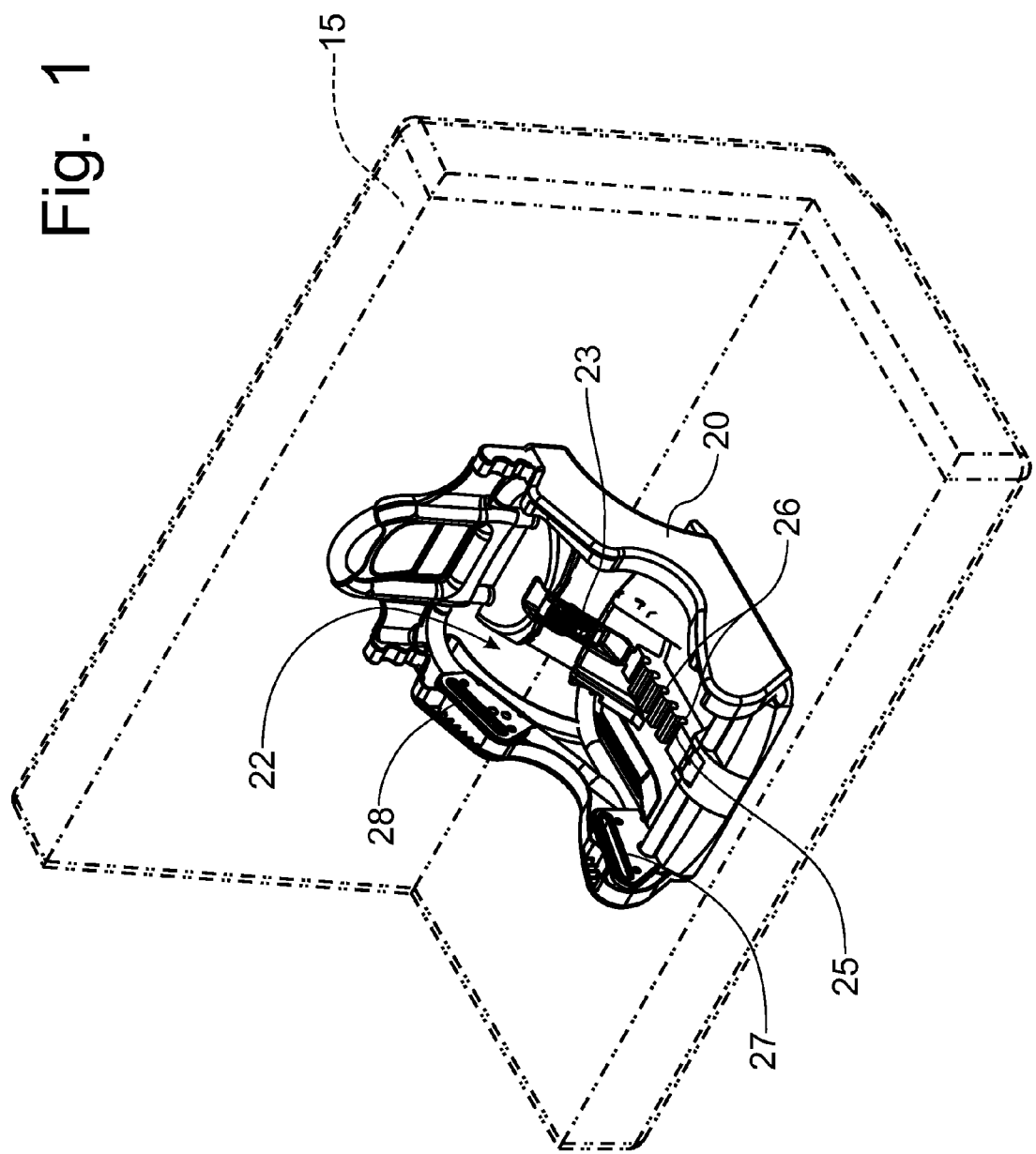
FIG. 1 is an upper, front perspective view of a base member, incorporating the principles of the instant invention, mounted on a representative vehicle seat, shown in phantom.

Referring now to FIGS. 1-11, a car seat incorporating the principles of the instant invention can best be seen. The car seat 10 can be configured in a number of different positions, as will be described in greater detail below, and is formed of a seat member 30 detachably mounted on a base member 20. As is best seen in FIGS. 1-3, the base member 20 is a separate member that is affixed to a vehicle seat 15, representatively shown in phantom, by the seat belt 17 of the vehicle. The vehicle seat belt 17 is pulled through a first side opening 22, across a saddle bearing a seat belt latch member 23 and out through the second side opening 22 to be connected to the vehicle seat belt latch member (not shown) and pull tight to capture the base member 20 on the vehicle seat 15. The seat belt latch member 23 secures the vehicle seat belt 17 to the base member 20 and is selectively movable to release the vehicle seat belt 17 from engagement with the base member 20.

Figure 7:
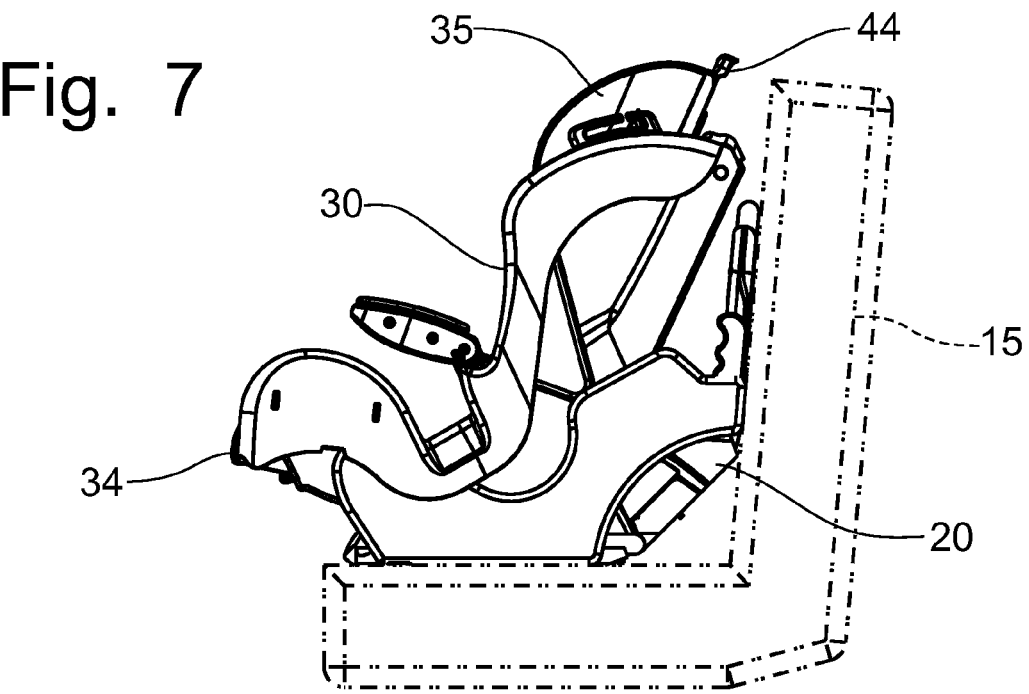
FIG. 7 is a left side elevational view similar to that of FIG. 5, but showing the forward facing seat member in a reclined position relative to the base member.
Figure 8:
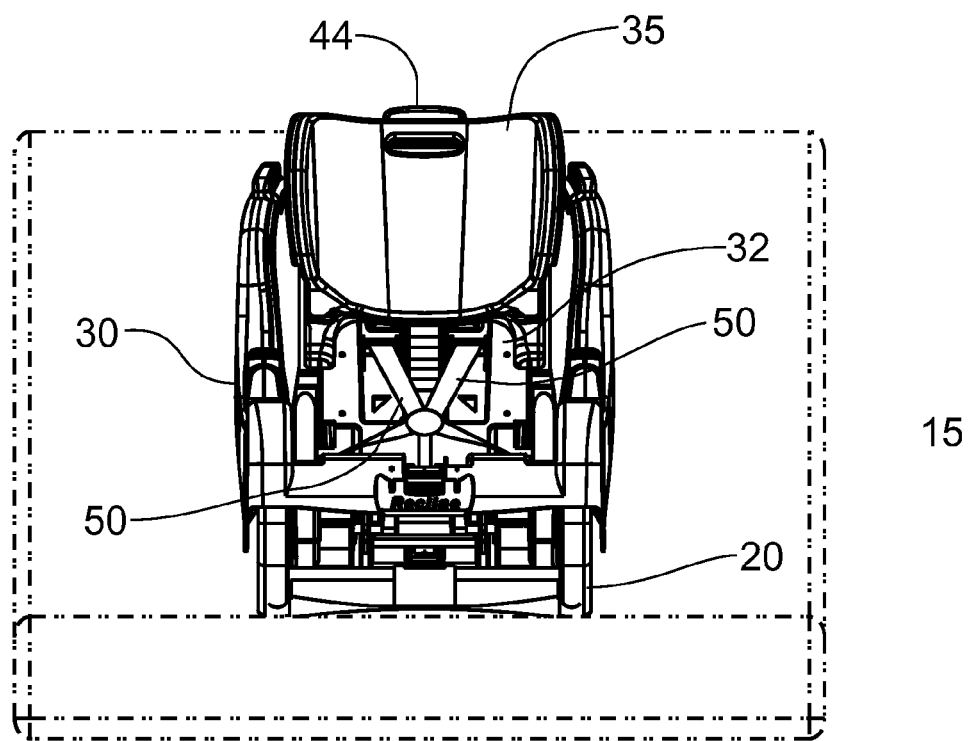
FIG. 8 is a front elevational view of the reclined seat member shown in FIG. 7, the representative vehicle seat being shown in phantom.

The base member is formed with a central rack member 25 having a plurality of parallel, horizontally disposed notches 26 to receive the recline latch apparatus 33, which include a transverse bar 33a that rests in one of the notches 26, on the seat member 30 to change the position of the seat member 30 on the base member 20. The base member is also formed with two pairs of opposing recline control slots 27, 28 into which retractable latch pins 61, 62 are engagable to secure the seat member 30 to the base member 20. The lower recline control slots 27 is positioned at a forward portion of the base member 20 and is oriented generally horizontally. The upper recline control slots 28 are located at a rearward portion of the base member 20, but are oriented at an inclined angle compared to the lower recline control slots 27. As a result, the rearward portion of the seat member 30 will lower as the forward portion of the seat member 30 moves forwardly to create a reclined orientation for the seat member 30. The upright configuration of the seat member 30, corresponding to the latch pins 61, 62 being positioned in the rearwardmost portions of the recline control slots 27, 28, is shown in FIGS. 4-6, while the recline configuration of the seat member 30, corresponding to the latch pins 61, 62 being positioned in the forwardmost portions of the recline control slots 27, 28, is depicted in FIGS. 7 and 8.

Figure 4:
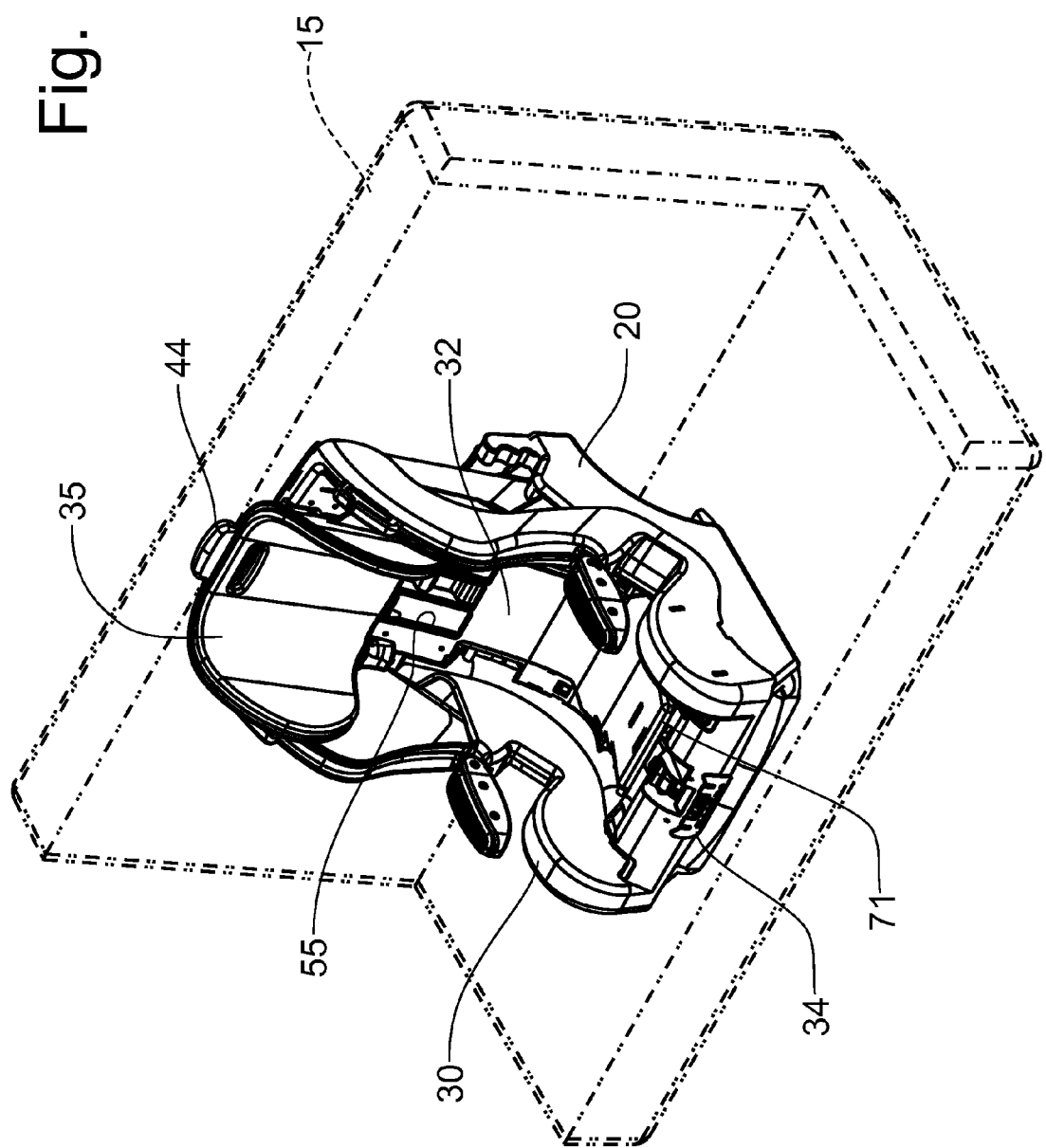
FIG. 4 is an upper, front perspective view, similar to that of FIG. 1, but showing a seat member incorporating the principles of the instant invention mounted on the base member in a forward-facing orientation with the seat positioned in a fully upright position, the representative vehicle seat being shown in phantom.
Figure 9:
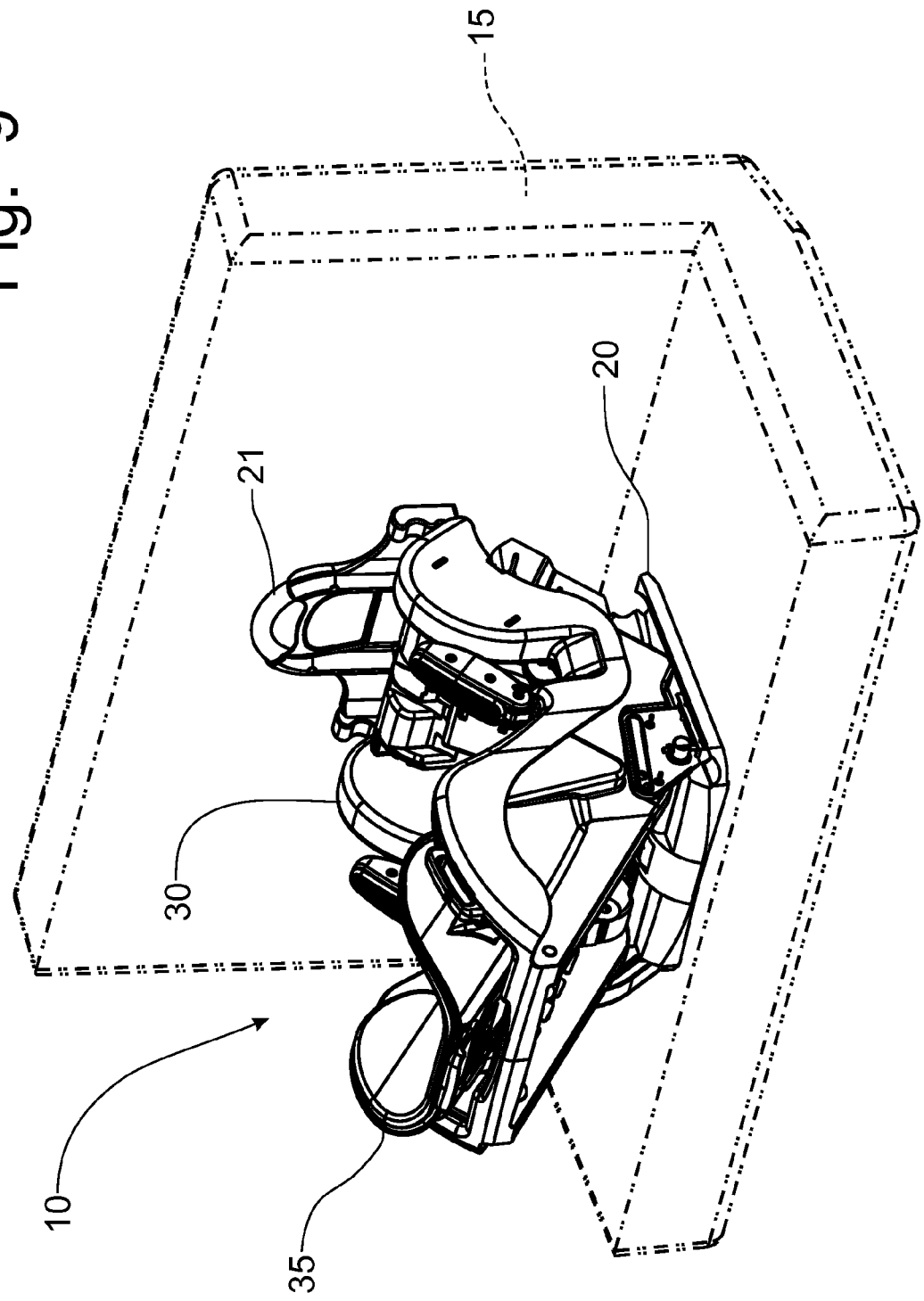
FIG. 9 is an upper, front perspective view, similar to that of FIG. 4, but showing the seat member mounted on the base member in a rear-facing orientation, the representative vehicle seat being shown in phantom.
Figure 12:
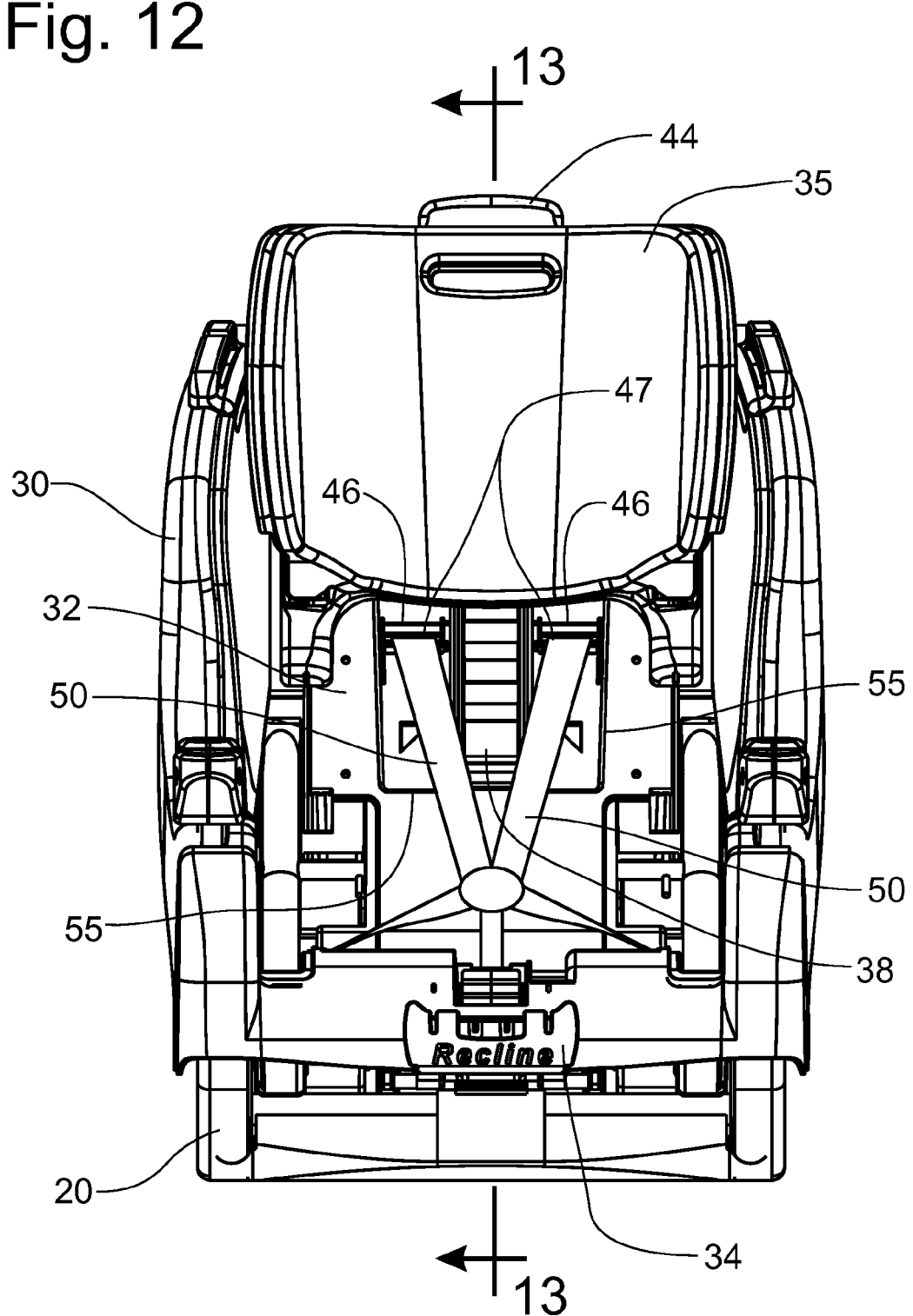
FIG. 12 is an enlarged front elevational view of the car seat incorporating the principles of the instant invention, the head rest being moved into a mid-range raised position.
Figure 13:
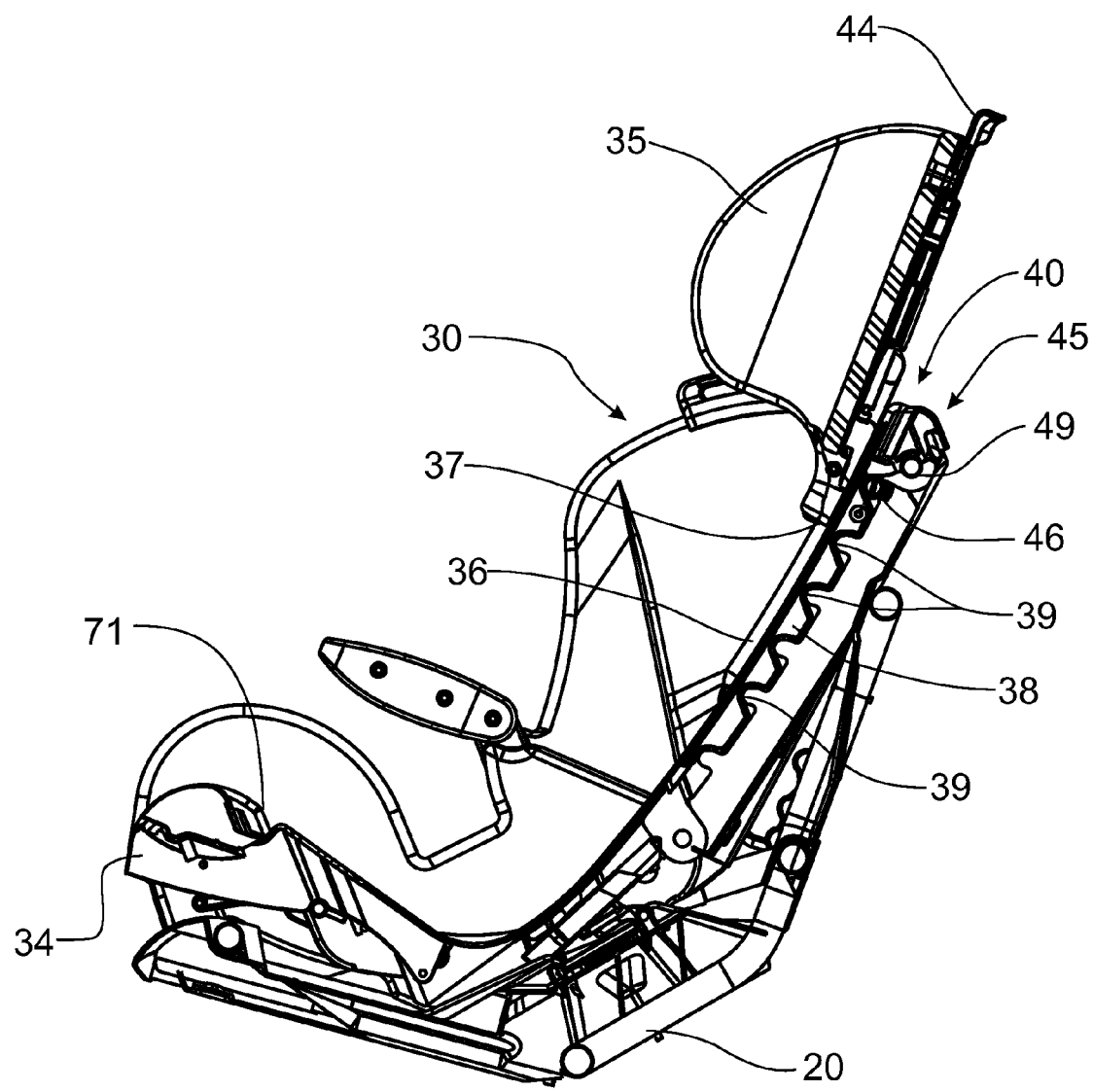
FIG. 13 is a cross-sectional view of the car seat corresponding to lines 13-13 of FIG. 12, but with the head rest moved to the fully raised position, to depict the head rest adjustment mechanism and the harness support apparatus incorporating the principles of the instant invention.
Figure 14:
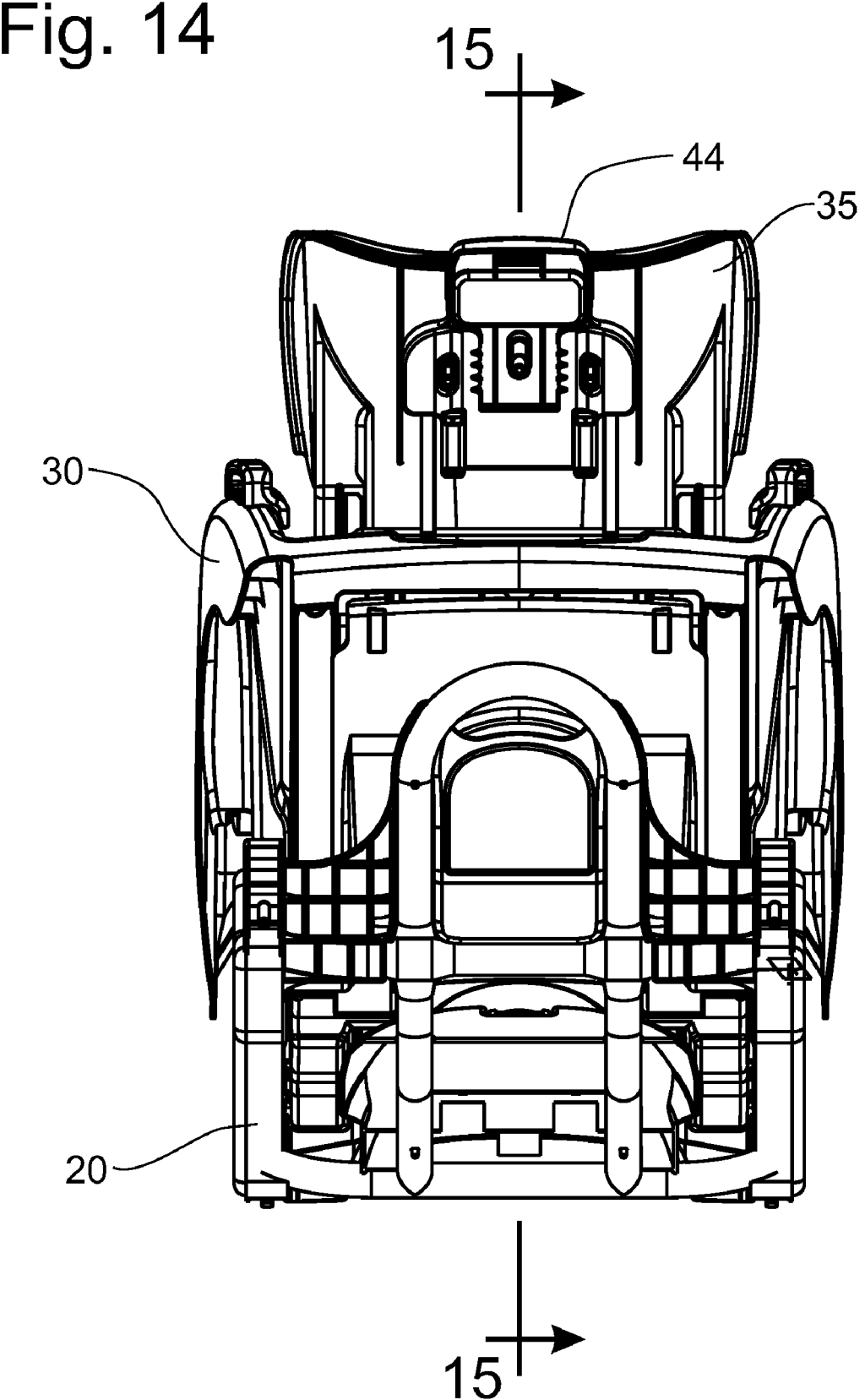
FIG. 14 is a rear elevational view of the car seat depicted in FIG. 12 with the seat member being moved into a reclined position, the head rest being located in the fully raised position.
Figure 15:
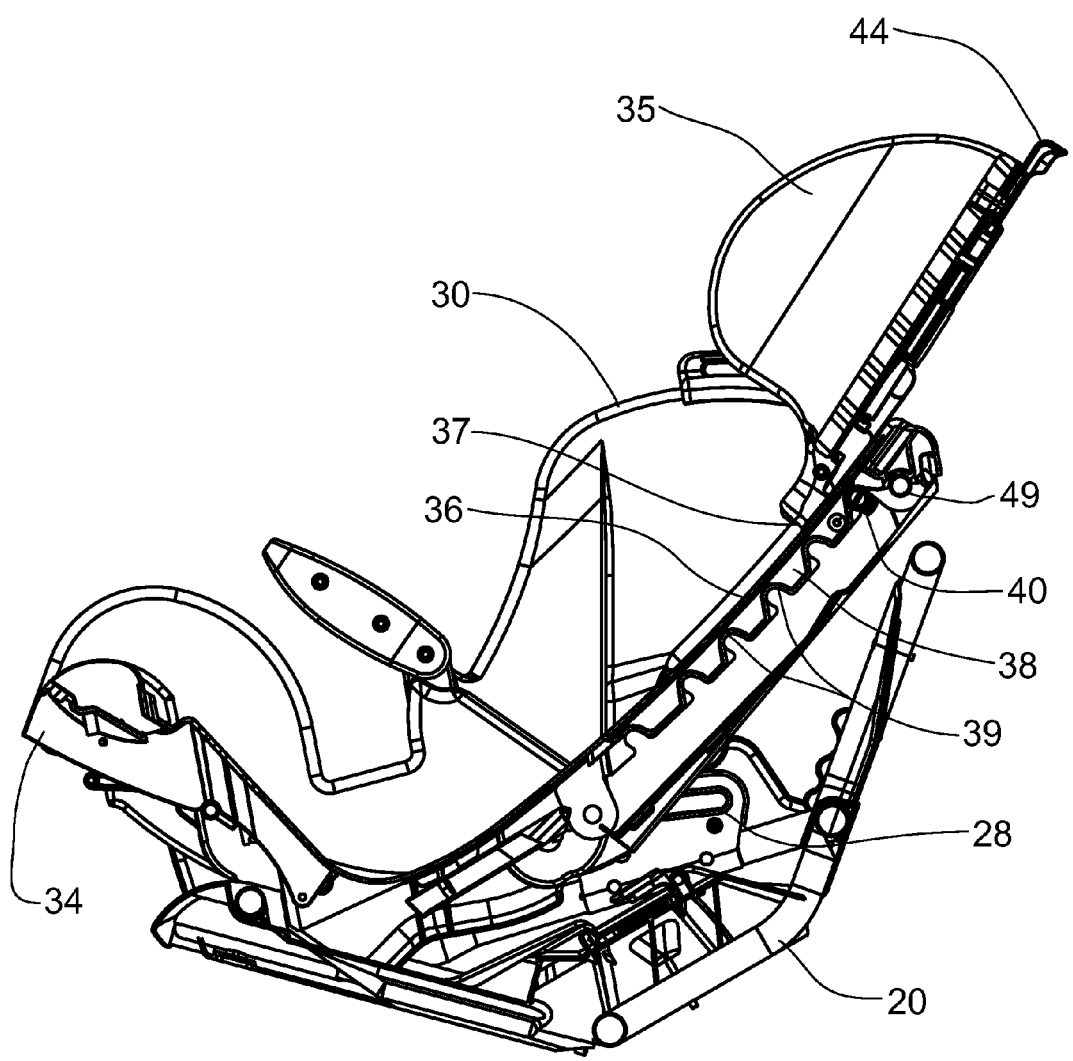
FIG. 15 is a cross-sectional view of the car seat corresponding to lines 15-15 of FIG. 14.
Figure 17:
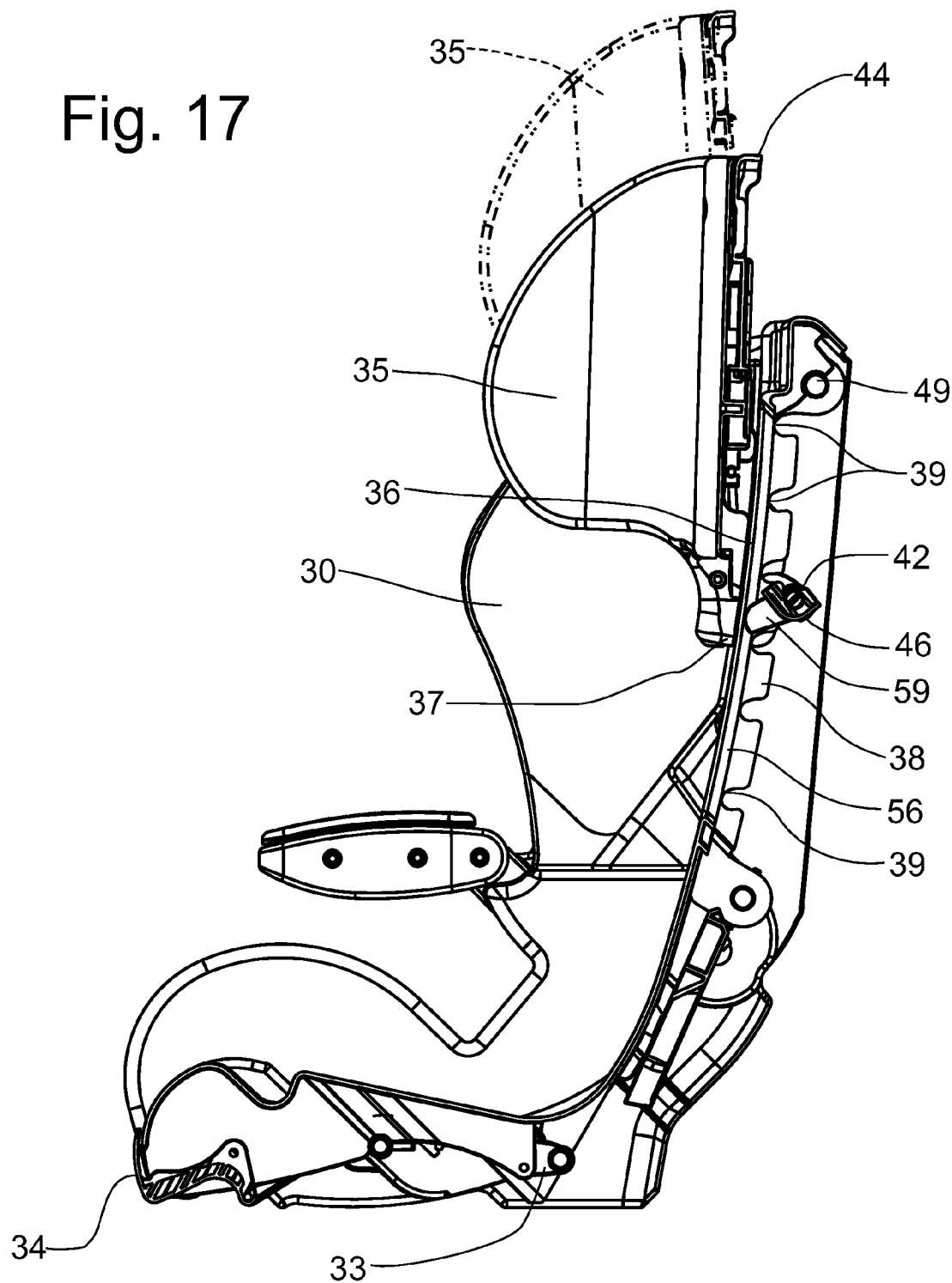
FIG. 17 is a cross-sectional view of the car seat corresponding to lines 17-17 of FIG. 16, the movement of the head rest from a mid-range raised position to a fully raised position being shown in phantom.
Figure 18:
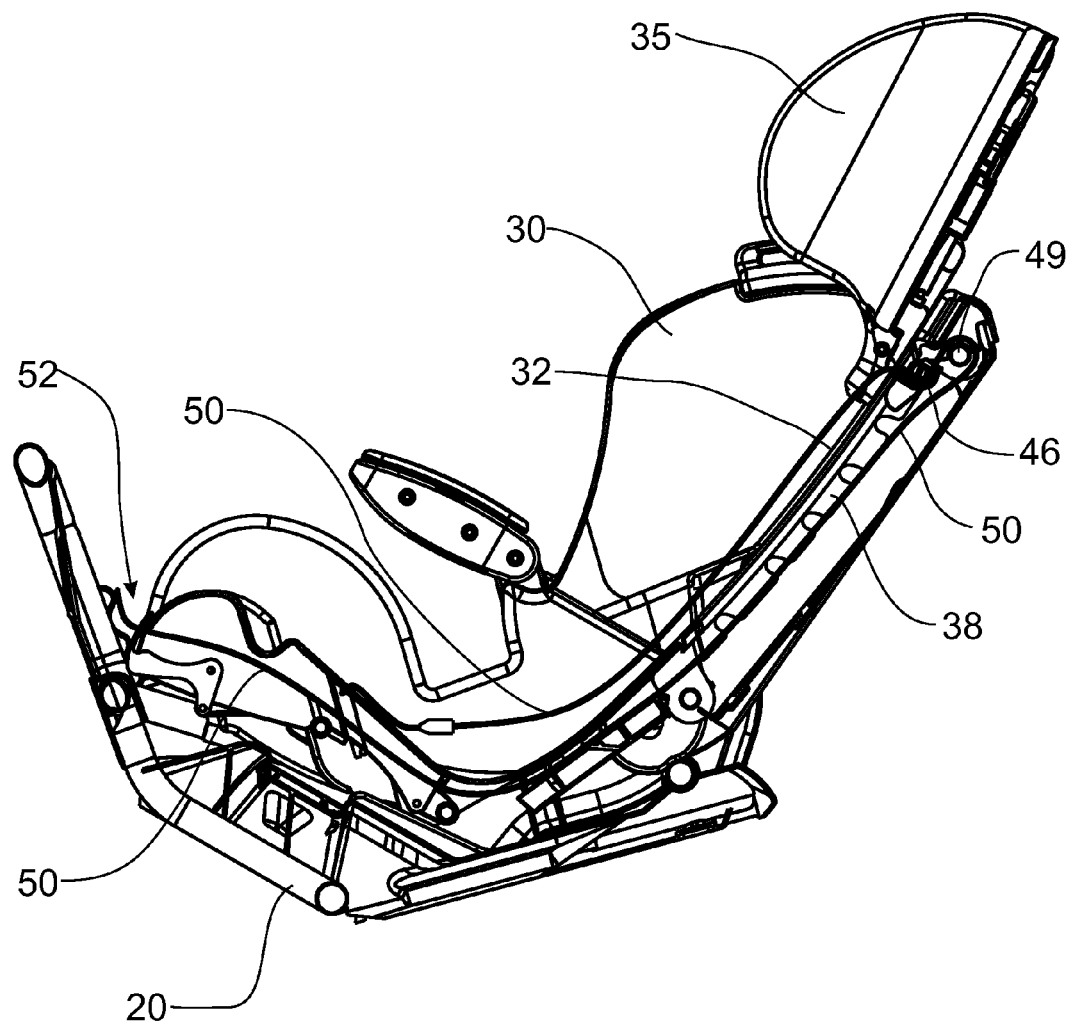
FIG. 18 is a cross-sectional view similar to that of FIG. 17, but showing the seat member moved into a rearwardly-facing orientation, the head rest being moved to the fully raised position.
Figure 19:
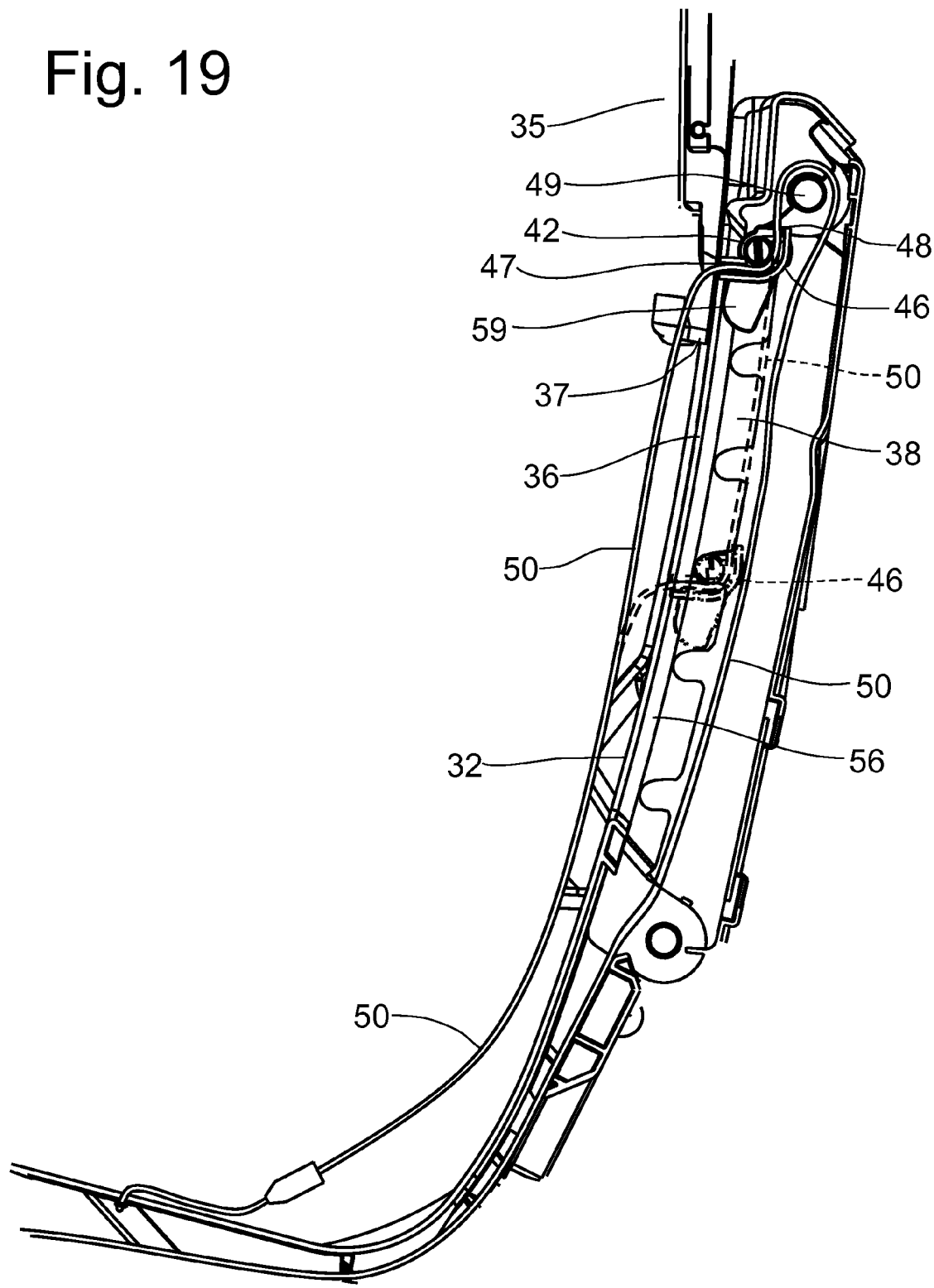
FIG. 19 is an enlarged partial cross-sectional view of the seat member showing the harness belt path, the belt path corresponding to a relocation of the head rest to a mid-range position being shown in phantom.

The seat member 30 can be mounted onto the base member 20 in either a forward-facing orientation, such as is depicted in FIG. 4, or in a rearwardly-facing orientation, as is shown in FIGS. 9-11. The seat member 30 includes two pairs of latch members 61, 62 that are retractable in conjunction with the movement of the actuator handle 71 at the bottom of the seat member 30. The movement of the actuator handle 71 is operable to cause a retraction of the latch pins 61, 62 into the body of the seat member 30 until the seat member 30 is properly positioned onto the base member 20, whereupon the latch pins 61, 62 are allowed to extend into the respective lower and upper recline control slots 27, 28 to trap the seat member 30 on the base member 20. The positioning of the seat member 30 onto the base member 29 places the recline latch apparatus 33 into engagement with the recline rack 25 to prevent the latch members, or latch pins, 61, 62 from sliding along the corresponding recline control slots 27, 28. The seat member 30 is configured such that the seat member 30 can be used as a booster seat for larger children by removing the base member 20 from the vehicle seat 15 and placing the seat member 30 directly on the vehicle seat 15 so that the vehicle seat belt 17 will pass around both the seat member 30 and the child positioned thereon by passing through the cutout slot 31, best seen in FIG. 17.

As seen in FIGS. 12-19, the seat member 30 includes a head rest 35 formed with slide members 37 that are generally vertically movable along a curved, concave path along the seat back 32 defined by concave curved tracks 36 formed on the back side of the seat back 32. Thus, as the head rest 35 is raised, the top portion of the head rest 35 moves inwardly toward the front of the seat member 30 providing a more upright back angle for the child as the child gets older and larger, requiring the upward movement of the head rest 35. The back portion of the seat member 30 has a control rack 38 formed into the curved track 36 and defining a plurality of vertically spaced notches 39 corresponding to different vertical positions for the head rest 35. The head rest 35 is connected to a lock mechanism 40 that engages the control rack 38. The lock mechanism 40 includes a lock bar 42 that rests in a selected notch 39 and is spring-loaded into engagement with the control rack 38. An actuation handle 44 is operatively connected to a pivot lever on the lock mechanism 40 to force the lock bar 42 out of engagement with the control rack 38 to enable the head rest 35 to be moved vertically.

The lock mechanism 40 includes a pair of laterally spaced guide members 46 that define openings 47 that are oriented generally horizontally. The guide member 46 controls the position of the harness belt 50 relative to the shoulders of the child seated in the car seat 10 and raises and lowers in response to the position of the lock mechanism 40 and the attached head rest 35. Thus, when the head rest 35 is raised along the curved track 36, the guide members 46 move accordingly and position the harness belt 50 to pass from behind the curved seat back 32 through openings in the seat back 32 to the front of the seat back 32 for engagement with the child seated on the car seat 10.

The harness support apparatus 45 includes a fixed guide bar 49 mounted within the seat back 32 above the control rack 38. The harness belt 50 is trapped in a conventional length adjustment device 52 at the lower front portion of the seat member 30. From the length adjustment device 52, the harness belt 50 passes underneath the seat portion of the seat member 30 and through the structure of the seat member 30 behind the seat back 32 and the control rack 38 to the fixed guide bar 49. The harness belt 50 loops over the fixed guide bar 49 and passes downwardly to the lock mechanism 40 behind the lock bar 42 and then through the guide members 46 to exit through the outlet openings 47 to extend to the front of the seat back 32. The harness belt 50 is secured to the seat member 30 in a conventional manner. The use of the fixed guide bar 49 secured to the frame of the seat back 32 provides an opportunity to use a metal rod that will increase the resistance of the harness belt 50 to pull out of the car seat 10 during crash events. Furthermore, the amount of bending of the fixed guide rod 49 can be used to evaluate the stresses incurred during a crash event and provide a positive indicator that a car seat 10 has been subjected to a crash event.

Referring now to FIGS. 13-19, the guide members 46 define a curved path through which the harness belt 50 is fed to change the direction of the harness belt 50 from a generally vertical inlet 48 to a generally horizontal outlet opening 47 wrapped around the lock bar 42. The guide members 46 are aligned with the generally vertical openings 55 formed in the seat back 32 so that the harness belts 50 can move vertically with the head rest 35 without impediment from the seat back 32. Soft goods (not shown), i.e. the padded covering over the seating surface of the seat member 30, are formed with corresponding openings therein to allow the passage of the harness belts 50 from the outlet openings 47 over the shoulders of the child seated in the seat member 30. The lock bar 42 extends through the guide members 46 to opposing sides thereof for pivotal actuation by the actuation handle 44 at the top of the head rest. The lock bar 42 extending between the guide members 46 is engagable with the control rack 38 to lock the head rest 35 at the desired position.

Figure 16:
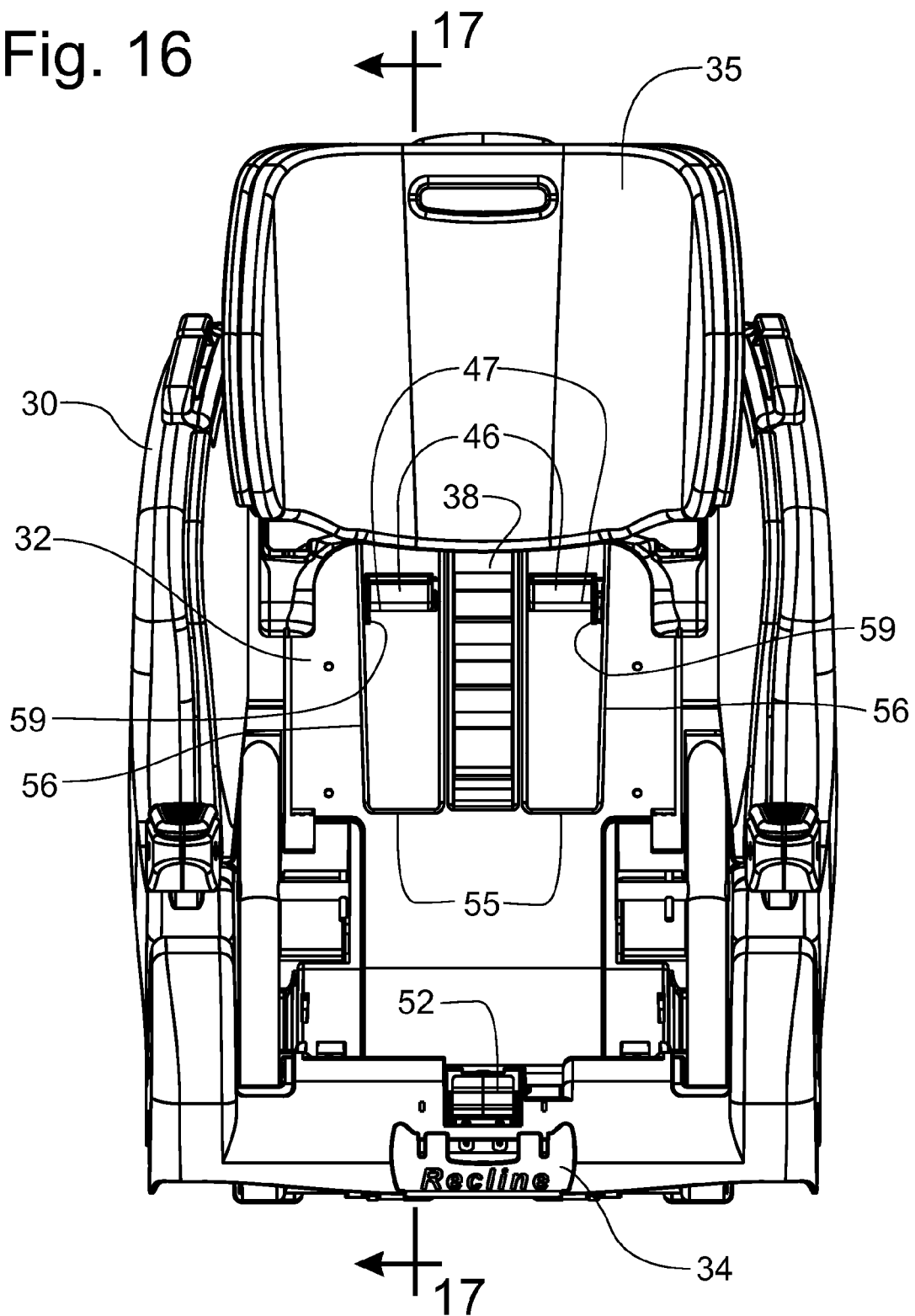
FIG. 16 is a front elevational view of the car seat in an upright orientation with the head rest moved into a mid-range position.

As is best seen in FIG. 16, the openings 55 are somewhat trapezoidal in shape, wider at the top and narrower at the bottom, so that the guide members 46 can move laterally along the lock bar 42 to move outwardly as the head rest is raised to accommodate the wider body of a growing child. The outside edge of each opening 55 is formed with a cam flange 56 that projects generally perpendicularly to the seat back 32 and is engagable with a follower 59 mounted on the guide member 46 to force the guide member 46 laterally on the lock bar 32 in response to the selected vertical position of the head rest 35.

Figure 20:
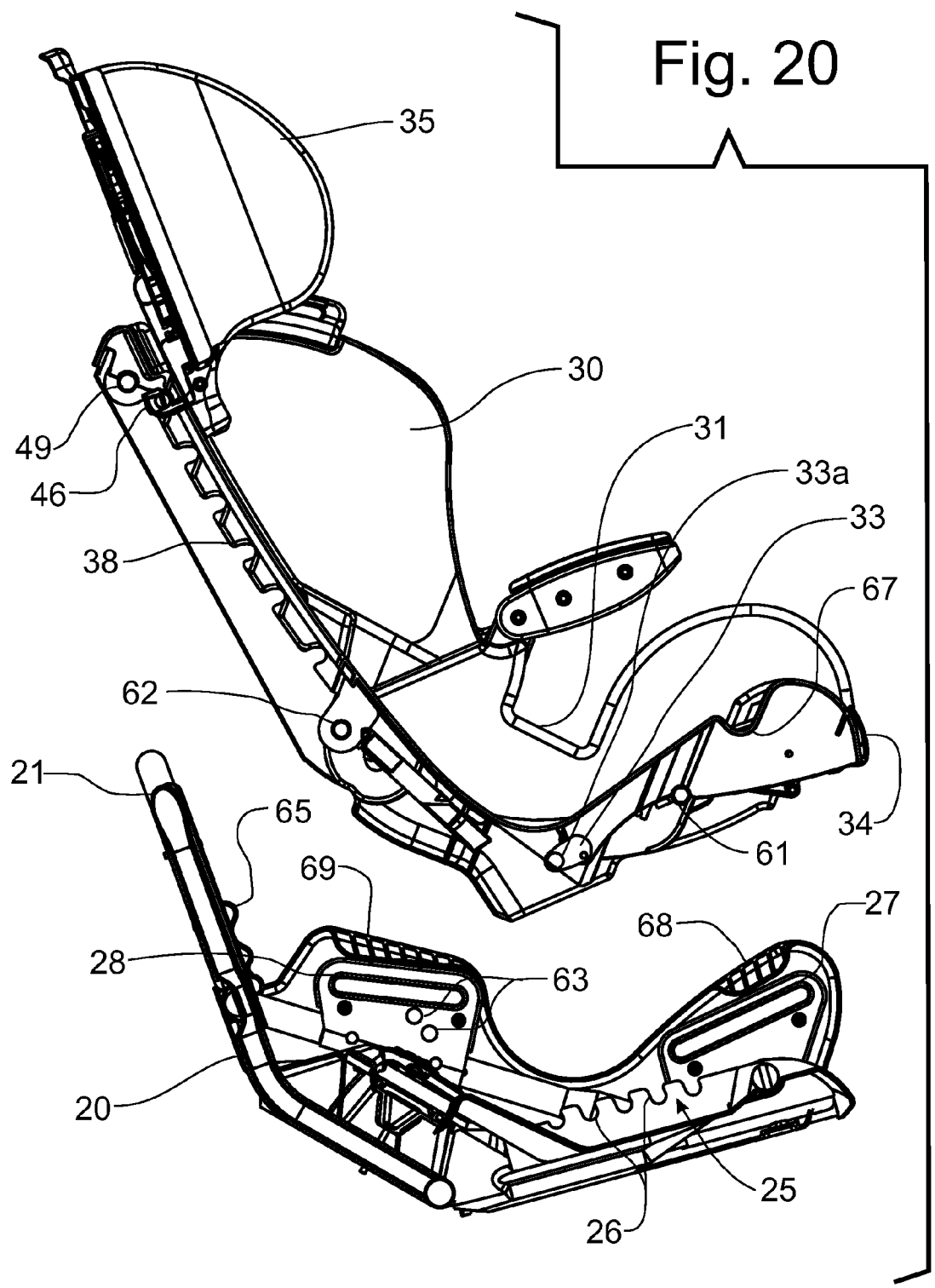
FIG. 20 is an exploded cross-sectional view of the car seat incorporating the principles of the instant invention with the seat member being positioned in a front-facing orientation above the base member.

Referring now to FIG. 20, the seat member 30 is detachable from the base member 20, which is mounted to the vehicle seat as is described above with respect to FIGS. 1-3. The seat member 30 carries opposing pairs of latch members 61, 62 that project into the lower and upper recline slots 27, 28 formed in the base member 20, as is described in greater detail above. With the latch pins 61, 62 secured within the recline slots 27, 28, the seat member 30 is movable in a fore-and-aft direction relative to the base member within the constraints provided by the length of the recline slots 27, 28. This fore-and-aft movement of the seat member 30 provides the ability of the seat member 30 to recline relative to the base member 20 and the vehicle seat on which the base member is mounted. The recline latch mechanism 33 on the seat member 30 includes a transverse latch bar 33a that is engagable with the central recline rack 25 to lock the seat member 30 in a desired recline position by fixing the recline latch bar 33a in one of the notches 26 in the rack member 25.

Figure 21:
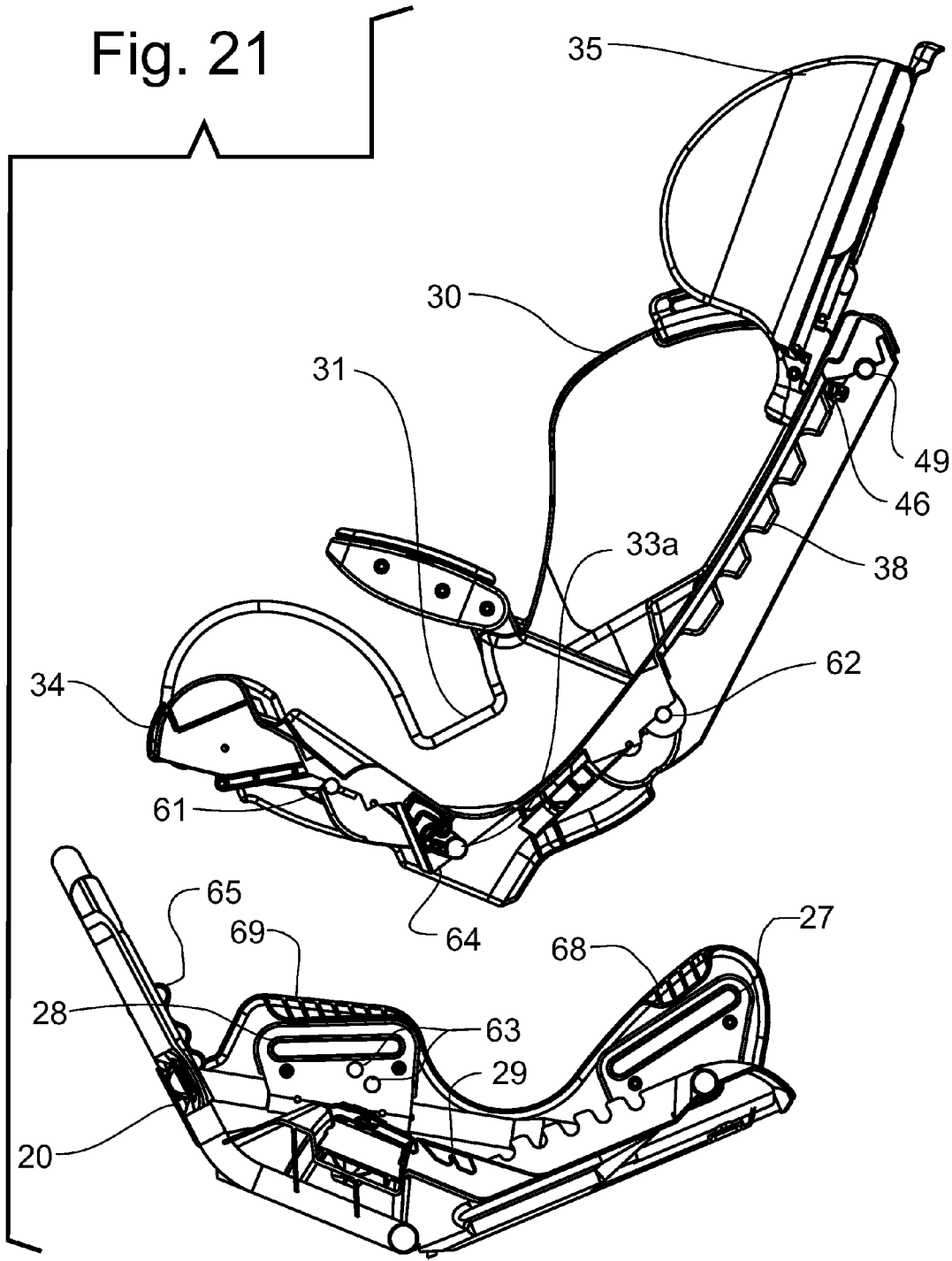
FIG. 21 is an exploded cross-sectional view of the car seat similar to that of FIG. 20, but with the seat member being positioned in a rear-facing orientation above the base member.

The rear-facing orientation of the seat member 30 exploded relative to the base member 20 is shown in FIG. 21. Referring now to FIGS. 9-11 and 21, one skilled in the art will note that the upper latch pin 62 can be positioned within the lower recline slot 27, while the lower latch pin 61 can be secured in one of the two latch holes 63 located below the upper recline slot 28, preferably on each opposing side of the base member 20. With the lower latch pin 61 fixed in one of the latch holes 63, the upper latch pin 62 cannot move within the lower recline slot 27, thus securing the seat member 30 to the base member 20. In the most reclined rear-facing position, the lower latch pin 61 will fall in the upper recline slot 28. Movement of the seat member 30, since the latch pins 61, 62 are all located within recline slots 27, 28, is limited by a stop finger 64 located on the seat member 30 engaging with a stop notch 29 located in the base member 20. The transverse latch bar 33a is located behind the central control rack 25 when the seat member 30 is in the rear-facing orientation. Therefore, the recline mechanism 33 is not operable to move the position of the seat member 30.

The forwardmost portion of the seat member 30 where the recline handle 34 is located is received within a generally vertical position control rack 65 which helps to stabilize the mounting of the seat member 30 in the rear-facing orientation. Similarly, the shell of the seat member 30 includes a hub 67 that forms a generally downwardly extending projection that is received within a forward socket 68 formed in the base member 20 above the lower recline slot 27 when the seat member 30 is in the rear-facing orientation, as is shown in FIG. 21. However, that hub 67 is received within the rearward socket 69 when the seat member 30 is in the forward-facing orientation. The reception of the hub 67 within the forward or rearward socket 68, 69 aligns the latch pins 61, 62 with the recline slots 27, 28 before engaging and restrains the lateral movement of the seat member 30 relative to the base member 20 and helps the seat member 30 to nest within the base member 20.

One skilled in the art will recognize that the base member 20 is formed with a rigid and sturdy frame 21, preferably formed from tubular steel to provide a suitable base member 20 that can be retained on the vehicle seat 15 irrespective of the orientation of the seat member 30 when mounted thereon.

The steel frame 21 enables the base member 20 to withstand substantial forces as a result of a vehicle crash event. Furthermore, the seat member is formed with a cutout 70 that facilitates the passage of the vehicle seat belt when the seat member 30 is used without the base member 20 as a booster seat for an older and larger child. The cutout 70 enables the passage of the vehicle seat belt around the child seated in the seat member when in a booster seat configuration to strap the child to the vehicle seat in a conventional manner.

Providing an intuitive and easy to follow, visible path for the installation of the vehicle seat belt on the base member, i.e. passing the vehicle seat belt through the two side openings 22 in the base member 20 and securing the seat belt on a latch member 23, allows the base member 20 to be installed on the vehicle seat 15 in a proper manner. Once the base member 20 has been installed, the base member does not need to be dismounted from the vehicle due to recline adjustments or reorientation of the seat member, unless the base member is going to be installed into another vehicle. Even then, the parent needs only to purchase multiple base members 20 to provide a convenient means by which the seat member 30 can be moved from vehicle to vehicle without requiring the disconnection of a base member 20 from the car seat. Thus, parents can have the convenience of having multiple car seats without purchasing multiple seat members 30.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A car seat for transporting a child on a vehicle seat of an automotive vehicle, said vehicle seat including a vehicle seat belt engagable with said car seat to secure said car seat to the vehicle seat, comprising:

a base member having a belt path passing through said base member and being formed with at least one pair of laterally opposing elongated recline slots; and a seat member selectively separable from said base member and being selectively engagable with said base member to provide a seating surface for said child to be transported thereon, said seat member being reversibly mountable on said base member in a selected one of two operable positions, including a forward-facing orientation and a rear-facing orientation, said seat member including at least one pair of latch pins that are engagable into and slidable within corresponding said recline slots so that said seat member is detachably mounted to said base member and movable longitudinally within said corresponding recline slots relative to said base member such that said latch pins secure said seat member to said base member while allowing said seat member to be moved relative to said base member into a selected recline position, said latch pins being operably connected to a central actuator on said seat member to retract opposing latch pins simultaneously from the corresponding said recline slots in the base member into said seat member so that said seat member can be moved relative to said base member between said forward-facing orientation and said rear-facing orientation.

2. The car seat of claim 1 wherein said base member is formed with a pair of laterally spaced side openings with a saddle portion separating said side openings to define said belt path, said vehicle seat belt being passable through said side openings and across said saddle portion to secure said base member to said vehicle seat.

3. The car seat of claim 2 wherein said saddle is formed with a seat belt latch member for detachably affixing said vehicle seat belt to said saddle portion.

4. A car seat for transporting a child on a vehicle seat of an automotive vehicle, said vehicle seat including a vehicle seat belt engagable with said car seat to secure said car seat to the vehicle seat, comprising:
   a base member having a belt path passing through said base member and being formed with at least one pair of laterally opposing recline slots and a recline control rack having a plurality of transversely oriented notches therein; and
   a seat member selectively separable from said base member and being selectively engagable with said base member to provide a seating surface for said child to be transported thereon, said seat member being reversibly mountable on said base member in a selected one of two operable positions, including a forward-facing orientation and a rear-facing orientation, said seat member including at least one pair of latch pins that are engagable into and slidable within corresponding said recline slots so that said seat member is detachably mounted to said base member and movable longitudinally within said corresponding recline slots relative to said base member, said latch pins being retractable from the base member into said seat member in order to move said seat member between said forward-facing orientation and said rear-facing orientation, said seat member further including a recline latch mechanism having a recline latch bar that is engagable with said recline control rack to restrain said seat member in a selected one of recline positions corresponding to said transverse notches.

5. The car seat of claim 4 wherein said base member is also formed with at least one latch hole adjacent one of said recline slots, a corresponding one of said latch pins on said seat member being engagable with said at least one latch hole to prevent recline movement of the seat member relative the base member when said seat member is placed into said rear-facing orientation.

6. The car seat of claim 5 wherein said recline latch bar is located adjacent said base member out of engagement with said recline control rack when said seat member is placed into said rear-facing orientation.

7. The car seat of claim 6 wherein said at least one pair of recline slots includes a pair of laterally opposed lower recline slots and a pair of laterally opposed upper recline slots, said at least one pair of latch pins including a pair of upper latch pins and a pair of lower latch pins cooperable, respectively, with each of said pairs of upper and lower recline slots, said at least one latch hole comprises a plurality of latch holes located on opposing sides of said seat member adjacent said upper recline slots, said latch holes being arranged to permit a positioning of said seat member in a selected orientation relative to said base member to accommodate an angular positioning of said vehicle seat, said pair of lower latch pins being movable within said lower recline slots when adjustment from one of said latch holes to another said latch hole is desired.

8. The car seat of claim 7 wherein said recline latch bar is pivotally connected to the recline latch mechanism which is pivotally movable through manipulation of an actuation handle, said latch pins of said seat member being movable along said upper and lower recline slots, respectively, when said seat member is moved to a new recline position secured by the placement of said recline latch bar in a corresponding said transverse notch of said recline control rack.

9. A car seat for transporting a child on a vehicle seat of an automotive vehicle, said vehicle seat including a vehicle seat belt engagable with said car seat to secure said car seat to the vehicle seat, comprising:
   a base member having a belt path passing through said base member for the passage of said vehicle seat belt and being formed with at least one pair of laterally opposing slots and with a saddle portion located between said laterally opposing slots, said saddle portion defining said belt path; and
   a seat member selectively separable from said base member and being selectively engagable with said base member to provide a seating surface for said child to be transported thereon, said seat member being reversibly mountable on said base member in a selected one of two operable positions without requiring reorientation of said base member, including a forward-facing orientation and a rear-facing orientation, said seat member including at least one pair of latch members that are engagable respectively with said at least one pair of laterally opposing slots so that said seat member is detachably mounted to said base member, said seat member being provided with a guide allowing the vehicle seat belt to secure the seat member to the vehicle seat when the seat member is removed from the base member, said seat member being usable without said base member as a booster seat.

10. The car seat of claim 9 wherein each of the at least one pair of latch members are retractable pins engaged respectively with corresponding said slots, said saddle portion including a belt latch member for engaging said vehicle seat belt.

11. The car seat of claim 9 wherein the car seat includes a recline mechanism having a first component mounted on said base member and incorporating a plurality of longitudinally spaced positions, a second component mounted on said seat member and being selectively engagable with said first component to permit operation of said recline mechanism to move said seat member relative to said base member from one recline position to another recline position.

12. The car seat of claim 9 wherein the at least one pair of latch members are slidable within corresponding said at least one pair of opposing slots so that the seat member moves relative the base member from one recline position to another recline position.

13. The car seat of claim 12 wherein the latch members are retractable pins engaged respectively with the corresponding said slots.

14. A car seat for transporting a child on a vehicle seat of an automotive vehicle, said vehicle seat including a vehicle seat belt, comprising:
   a base member having a belt path passing through said base member for the passage of said vehicle seat belt; and
   a seat member selectively separable from said base member and being selectively engagable with said base member to provide a seating surface for said child to be transported thereon, said seat member being reversibly mountable on said base member in a selected one of two operable positions, including a forward-facing orientation and a rear-facing orientation, without requiring reorientation of said base member when said base member is secured to the vehicle via the vehicle seat belt, said seat member being provided with a guide allowing the vehicle seat belt to secure the seat member and the child when sitting on the seat member simultaneously to the vehicle seat when the seat member is removed from the base member such that said seat member can be selectively utilized without the base member as a booster seat, said seat member including two laterally opposing pairs of latch pins that are engagable with corresponding pairs of laterally opposing elongated recline slots to detachably mount said seat member to said base member.

15. The car seat of claim 14 wherein said latch pins are retractable from the base member into said seat member in order to move said seat member between said forward-facing orientation and said rear-facing orientation.

16. The car seat of claim 15 wherein said car seat includes a recline mechanism having a first component incorporating a plurality of longitudinally spaced positions and a second component mounted on said seat member and being selectively engagable with said first component to permit operation of said recline mechanism to move said seat member relative to said base member between selected recline positions.

17. The car seat of claim 16 wherein said first component is a recline control rack having a plurality of transversely oriented notches therein, said second component including a recline latch mechanism having a recline latch bar that is engagable with said recline control rack to restrain said seat member in a selected one of recline positions corresponding to said transverse notches.

18. The car seat of claim 17 wherein said base member is also formed with at least one latch hole adjacent one of said recline slots, a corresponding one of said latch pins on said seat member being engagable with said at least one latch hole to prevent recline movement of the seat member relative the base member when said seat member is placed into said rear-facing orientation.

19. The car seat of claim 18 wherein said at least one latch hole comprises a plurality of latch holes located on opposing sides of said seat member adjacent one of said recline slots, said latch holes being arranged to permit a positioning of said seat member in a selected orientation relative to said base member to accommodate an angular positioning of said vehicle seat.

* * * * *